(12) United States Patent (10) Patent No.: US 12,260,523 B2
Kim et al. (45) Date of Patent: Mar. 25, 2025

(54) METHOD AND APPARATUS WITH IMAGE RECOGNITION

(71) Applicant: SAMSUNG ELECTRONICS CO., LTD., Suwon-si (KR)

(72) Inventors: Insoo Kim, Seongnam-si (KR); Seungju Han, Seoul (KR); Seong-jin Park, Suwon-si (KR); Jiwon Baek, Hwaseong-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 17/318,287

(22) Filed: May 12, 2021

(65) Prior Publication Data
US 2022/0156888 A1 May 19, 2022

(30) Foreign Application Priority Data

Nov. 13, 2020 (KR) ........................ 10-2020-0151482

(51) Int. Cl.
*G06T 5/70* (2024.01)
*G06N 3/045* (2023.01)
*G06N 3/08* (2023.01)
*G06T 3/4046* (2024.01)
*G06T 5/73* (2024.01)

(52) U.S. Cl.
CPC .............. *G06T 5/70* (2024.01); *G06N 3/045* (2023.01); *G06N 3/08* (2013.01); *G06T 3/4046* (2013.01); *G06T 5/73* (2024.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2017/0061246 | A1 | 3/2017 | Chen et al. | |
| 2018/0174275 | A1* | 6/2018 | Bourdev | G06V 30/19173 |
| 2019/0197662 | A1* | 6/2019 | Sloan | G06N 3/045 |
| 2019/0303720 | A1 | 10/2019 | Karam et al. | |
| 2020/0042891 | A1* | 2/2020 | Itach | G06V 10/774 |
| 2020/0184244 | A1* | 6/2020 | Mansour | G06F 18/214 |

(Continued)

FOREIGN PATENT DOCUMENTS

| CN | 108304846 A | 7/2018 |
| KR | 10-1780057 B1 | 9/2017 |

(Continued)

OTHER PUBLICATIONS

Ghifary, Muhammad, et al. "Domain generalization for object recognition with multi-task autoencoders." Proceedings of the IEEE international conference on computer vision. 2015. (Year: 2015).*

(Continued)

*Primary Examiner* — Andrae S Allison
(74) *Attorney, Agent, or Firm* — NSIP Law

(57) ABSTRACT

An image recognition method includes: receiving an input image of a first quality; extracting an input feature of a second quality of the input image from the input image by inputting the input image to an encoding model in an image recognizing model; and generating a recognition result for the input image based on the input feature.

15 Claims, 12 Drawing Sheets

(56) References Cited

U.S. PATENT DOCUMENTS

| | | | | |
|---|---|---|---|---|
| 2020/0372088 | A1* | 11/2020 | Liu | G06F 16/9532 |
| 2021/0216817 | A1* | 7/2021 | Sommerlade | G06F 18/214 |
| 2021/0224511 | A1* | 7/2021 | Guo | G06V 10/40 |
| 2022/0058377 | A1* | 2/2022 | Baek | G06F 18/214 |
| 2022/0101144 | A1* | 3/2022 | Vahdat | G06N 3/047 |
| 2022/0130176 | A1* | 4/2022 | Lee | G06F 18/254 |
| 2022/0188559 | A1* | 6/2022 | Baek | G06T 7/73 |
| 2022/0237405 | A1* | 7/2022 | Wang | G06V 10/751 |
| 2023/0095716 | A1* | 3/2023 | Jung | G06V 10/806 382/156 |
| 2023/0222781 | A1* | 7/2023 | Kim | G06V 10/7715 382/156 |

FOREIGN PATENT DOCUMENTS

| | | |
|---|---|---|
| KR | 10-2019-0089777 A | 7/2019 |
| KR | 10-2020-0007022 A | 1/2020 |

OTHER PUBLICATIONS

I. Kim, S. Han, J.-W. Baek, S.-J. Park, J.-J. Han and J. Shin, "Quality-Agnostic Image Recognition via Invertible Decoder," 2021 IEEE/CVF Conference on Computer Vision and Pattern Recognition (CVPR), Nashville, TN, USA, 2021, pp. 12252-12261, doi: 10.1109/CVPR46437.2021.01208. (Year: 2021).*

Linfeng Zhang, Muzhou Yu, Tong Chen, Zuoqiang Shi, Chenglong Bao and Kaisheng Ma, "Auxiliary training: Towards accurate and robust models", The IEEE Conference on Computer Vision and Pattern Recognition (CVPR), 2020. (Year: 2020).*

Kim, Insoo, et al. "Quality-agnostic image recognition via invertible decoder." Proceedings of the IEEE/CVF Conference on Computer Vision and Pattern Recognition. 2021. (Year: 2021).*

Zhao, Junbo, et al. "Stacked What-Where Auto-Encoders." *Workshop track-ICLR* arXiv:1506.02351v8 Feb. 14, 2016 (12 pages in English).

Zhang, Yuting, et al. "Augmenting Supervised Neural Networks with Unsupervised Objectives for Large-Scale Image Classification." *International conference on machine learning* arXiv:1606.06582v1 PMLA, Jun. 21, 2016 (17 pages in English).

Williams, Jerome et al. "Region of Interest Autoencoders with an Application to Pedestrian Detection." *International Conference on Digital Image Computing: Techniques and Applications (DICTA).* IEEE, 2017 (8 pages in English).

Extended European Search Report issued on Dec. 22, 2021 in counterpart European Patent Application No. 21186422.8 (11 pages in English).

Choi, Jun-Ho, et al. "Evaluating robustness of deep image super-resolution against adversarial attacks." Proceedings of the IEEE/CVF International Conference on Computer Vision. 2019. (9 pages in English).

Rozsa, Andras, Manuel Günther, and Terrance E. Boult. "Are accuracy and robustness correlated." 2016 15th IEEE international conference on machine learning and applications (ICMLA). IEEE, 2016. (6 pages in English).

Hendrycks, Dan, and Thomas Dietterich. "Benchmarking neural network robustness to common corruptions and perturbations." arXiv preprint arXiv:1903.12261 (2019). (16 pages in English).

* cited by examiner

METHOD AND APPARATUS WITH IMAGE RECOGNITION

CROSS-REFERENCE TO RELATED APPLICATIONS

This application claims the benefit under 35 USC § 119(a) of Korean Patent Application No. 10-2020-0151482 filed on Nov. 13, 2020, in the Korean Intellectual Property Office, the entire disclosure of which is incorporated herein by reference for all purposes.

BACKGROUND

1. Field

The following description relates to a method and apparatus with image recognition.

2. Description of Related Art

Technical automation of a recognition process may be implemented through a neural network model implemented, for example, by a processor as a special computing structure, which provides intuitive mapping for computation between an input pattern and an output pattern after considerable training. A trained ability to generate such mapping is the learning ability of a neural network. Furthermore, a neural network trained and specialized through special training may have, for example, a generalization ability to provide a relatively accurate output with respect to an untrained input pattern.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image recognition method includes: receiving an input image of a first quality; extracting an input feature of a second quality of the input image from the input image by inputting the input image to an encoding model in an image recognizing model; and generating a recognition result for the input image based on the input feature.

The encoding model may be configured to extract, in response to an input of a second input image of the second quality, a second input feature of the second quality from the second input image.

The encoding model may be a neural network-based model that is trained in advance to extract the input feature of the second quality from the input image irrespective of whether the input image is of the first quality or of the second quality.

The method may include: generating an output image of the second quality by inputting the input feature to a decoding model in the image recognizing model.

The decoding model may be a neural network-based model that is trained in advance to generate the output image of the second quality based on the input feature of the second quality.

The method may include: outputting both the recognition result and the output image.

The method may include: determining a decoding parameter by training a temporary model with a primary training image set of a second quality; fixing a parameter of the decoding model to be the decoding parameter, the image recognizing model comprising an encoding model and the decoding model; and training the image recognizing model, including the fixed parameter, with a secondary training image set of a first quality and the second quality.

A non-transitory computer-readable storage medium may store instructions that, when executed by a processor, configure the processor to perform the method.

In another general aspect, an image recognition method includes: determining a decoding parameter by training a temporary model with a primary training image set of a second quality; fixing a parameter of a decoding model in an image recognizing model to be the decoding parameter, the image recognizing model comprising an encoding model and the decoding model; and training the image recognizing model, including the fixed parameter, with a secondary training image set of a first quality and the second quality.

The temporary model may include a temporary encoding model and a temporary decoding model, and the determining of the decoding parameter may include: determining a recognition loss based on a first training feature extracted by the temporary encoding model from a first training image in the primary training image set; determining a reconstruction loss based on a first output image reconstructed by the temporary decoding model based on the first training feature; and updating the temporary model based on the recognition loss and the reconstruction loss.

The temporary model may include a temporary invertible encoding model, and the determining of the decoding parameter may include: determining a recognition loss based on a first training feature extracted by the temporary invertible encoding model from a first training image in the primary training image set; and determining the decoding parameter by updating the temporary model based on the recognition loss.

The fixing of the parameter of the decoding model may include determining the decoding model by inverting the temporary invertible encoding model.

The training of the image recognizing model may include: determining a recognition loss according to a second training feature extracted by the encoding model from a second training image in the secondary training image set; determining a reconstruction loss according to a second output image reconstructed by the decoding model based on the second training feature; and updating the image recognizing model based on the recognition loss and the reconstruction loss.

In another general aspect, an electronic device includes: a processor configured to extract an input feature of a second quality of an input image of a first quality from the input image by inputting the input image to an encoding model in an image recognizing model, and generate a recognition result for the input image based on the input feature.

The encoding model may be configured to extract, in response to an input of a second input image of the second quality, a second input feature of the second quality from the second input image.

The encoding model may be a neural network-based model that is trained in advance to extract the input feature of the second quality from the input image irrespective of whether the input image is of the first quality or of the second quality.

The processor may be configured to generate an output image of the second quality by inputting the input feature to a decoding model in the image recognizing model.

The decoding model may be a neural network-based model that is trained in advance to generate the output image of the second quality based on the input feature of the second quality.

The display module may be configured to output both the recognition result and the output image.

The recognition result may be category information of an object in the input image, and the output image may have an improved quality compared to the input image.

The device may include: a camera configured to generate the input image; and a display module configured to output the recognition result.

In another general aspect, an image recognition method includes: training a first model, including a first image recognition encoder and an image reconstruction decoder, based on a training set including high-quality images and excluding low-quality images; and training a second model, including a second image recognition encoder and the decoder, based on a training set including both high-quality images and low-quality images, wherein parameters of the decoder in the training of the second model are fixed to be parameters of the decoder resulting from the training of the first model.

The decoder of the trained second model may be configured to reconstruct a high-quality output image corresponding to a low-quality input image, based on a feature vector generated by the second encoder based on a low-quality input image.

The high-quality images may differ from the low-quality images with respect to any one or more of a resolution, a pixel size, an amount of brightness, an amount of noise, and an amount of blur.

Other features and aspects will be apparent from the following detailed description, the drawings, and the claims.

Figure 1:
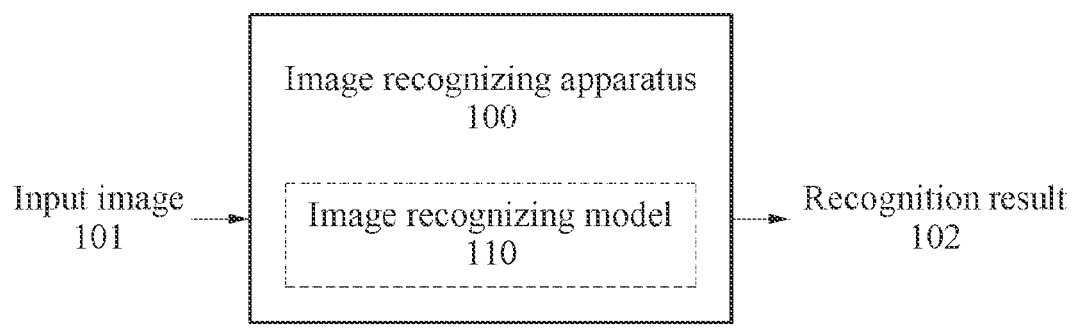
FIG. 1 illustrates an example of a recognition operation of an image recognizing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a recognition operation of an image recognizing apparatus. Referring to FIG. 1, an image recognizing apparatus 100 may receive an input image 101. The input image 101 may be generated by a camera and transmitted to the image recognizing apparatus 100 for image recognition. The image recognizing apparatus 100 may perform recognition processing on the input image 101 and outputs a recognition result 102. The input image 101 may include an object, and the recognition processing may include processing for recognizing an object in the input image 101 (e.g., object recognition).

Object recognition may include object detection that detects an object in the input image 101, object tracking that tracks an object, object classification that specifies the category of an object, object identification that specifies the identity of an object, and/or object authentication that confirms the authority of an object, as non-limiting examples. The recognition result 102 may include the result of such recognition processing. For example, the recognition result 102 may include position information of an object (e.g., coordinates of an object box) obtained by object detection or object tracking, category information (e.g., person, animal, dog, cat, etc.) obtained by object classification, identity information (e.g., user, celebrity, etc.) obtained by object identification, and/or an authentication result (e.g., an authentication value for unlocking a smart phone) obtained by object authentication, as non-limiting examples.

The image recognizing apparatus 100 may perform recognition processing on the input image 101 by using an image recognizing model 110. The image recognizing model 110 may be a deep learning-based neural network model. A neural network may perform an operation (e.g., an object recognizing operation) according to the purpose of learning by mapping the input data and output data which are in a non-linear relationship based on deep learning. Deep learning is a machine learning technique for solving an issue such as image or speech recognition from a big data set. Deep learning may be construed as an optimization problem solving process of finding a point at which energy is minimized while training a neural network using prepared training data.

Through supervised or unsupervised learning of deep learning, a structure of the neural network or a weight corresponding to a model may be obtained, and the input data and the output data may be mapped to each other through the weight. If the width and the depth of the neural network are sufficiently great, the neural network may have a capacity sufficient to implement a predetermined function. The neural network may achieve an optimized performance when learning a sufficiently large amount of training data through an appropriate training process.

Hereinafter, the neural network or network parameters (e.g., weights) may be expressed as being trained "in advance". Here, "in advance" means before the neural network is "started". That the neural network "starts" means that the neural network is ready for inference. For example, that the neural network that is "started" may include that the neural network is loaded into a memory, or that input data for inference is input into the neural network after the neural network is loaded into the memory.

The neural network may include a plurality of layers. In this example, the neural network may also be referred to as a deep neural network (DNN). The plurality of layers may include an input layer, one or more hidden layers, and an output layer. The neural network may be or include various types of networks such as a fully connected network, a convolutional neural network (CNN), and/or a recurrent neural network (RNN).

The performance of the neural network may depend on the training characteristics. A typical neural network trained with high-quality training images may recognize high-quality images well but exhibit relatively poor performance in recognizing low-quality images. High quality and low quality may be determined according to reference values for various factors such as resolution, size, brightness, noise, and/or blur. For example, a high-quality image and a low-quality image may be determined based on a predetermined resolution. In addition to the resolution, noise or blur may be used as the criterion. More diverse levels may be defined to determine quality. For example, in addition to high quality and low quality, intermediate quality may be defined between the high quality and the low quality.

Although a typical neural network may be trained with high-quality and low-quality training images, such typical neural network may have relatively poor performance in recognizing high-quality images, when compared to a typical neural network trained only with high-quality training images. For the typical neural network trained with high-quality training images to recognize low-quality images, a typical method of improving the quality of the low-quality images and then inputting the images of improved quality to the neural network may be used. Using this typical method, however, additional processing for quality improvement may be required, and there is no guarantee that such quality improvement necessarily helps with image recognition. This is because the quality in the aspect of quality improvement may not coincide with the quality in the aspect of recognition in the neural network. Further, a typical separate use of a high-quality image exclusive neural network trained with high-quality training images and a low-quality image exclusive neural network trained with low-quality training images may be inefficient.

In contrast, a two-stage training method of one or more embodiments using a decoder may be used to derive the image recognizing model 110 that is robust to images of various qualities. Accordingly, as a single model, the image recognizing model 110 of one or more embodiments may maintain high recognition performance for input images 101 of various qualities, for example, for both an input image 101 of high quality and an input image 101 of low quality. More specifically, the image recognizing model 110 may be trained in two stages using an encoder that extracts features as well as a decoder that reconstructs an image from the features.

In Stage 1 of the two-stage training method of one or more embodiments, a primary recognition model (also referred to as a temporary model) including a temporary encoder and a temporary decoder may be trained with high-quality training images. In this case, a loss function reflects a recognition loss related to image recognition through the temporary encoder and a reconstruction loss related to image reconstruction by the temporary decoder. Accordingly, the temporary encoder may be trained to increase the performance of recognizing high-quality images, and the temporary decoder may be trained to reconstruct high-quality images from features of the high-quality images. In Stage 1, the primary recognition model may alternatively include a temporary invertible encoder instead of the temporary encoder and the temporary decoder, non-limiting examples of which will be described in more detail later.

In Stage 2 of the two-stage training method of one or more embodiments, a new secondary recognition model including an encoder and a decoder may be trained with high-quality and low-quality training images. In this example, the parameters of the decoder may be fixed to the trained parameters of the temporary decoder trained in Stage 1 (e.g., the parameters of the decoder may be set to be the trained parameters of the temporary decoder trained in Stage 1 and may be fixed in value such that the parameters do not change in the training of Stage 2). A loss function of Stage 2 reflects a recognition loss related to image recognition through the encoder and a reconstruction loss related to image reconstruction by the decoder. Since the parameters of the temporary decoder are trained to reconstruct high-quality images from the features of high-quality images, the reconstruction loss may increase when features of low-quality training images are input to the decoder. Thus, the two-stage training method of one or more embodiments may train the encoder to extract features corresponding to high-quality images from low-quality images.

The image recognizing model 110 may be configured to include both an encoder and a decoder of this secondary recognition model, or may be configured to include the encoder and exclude the decoder. In the former case, the decoder may extract features from the input image 101 and generate a high-quality output image based on the features. Accordingly, the image recognizing apparatus 100 may output the output image together with the recognition result 102, or the recognition result 102 may further include the output image. Also, in both cases, the image recognizing model 110 includes an encoder, and according to the above description of the training process, the encoder may extract features of high quality irrespective of whether the input image 101 is of high quality or of low quality. Accordingly, the image recognizing model 110 of one or more embodiments may exhibit a recognition performance of a consistent level regardless of the quality of the input image 101. Hereinafter, non-limiting examples of the configuration of the image recognizing model 110 will be described in more detail.

Figure 2:
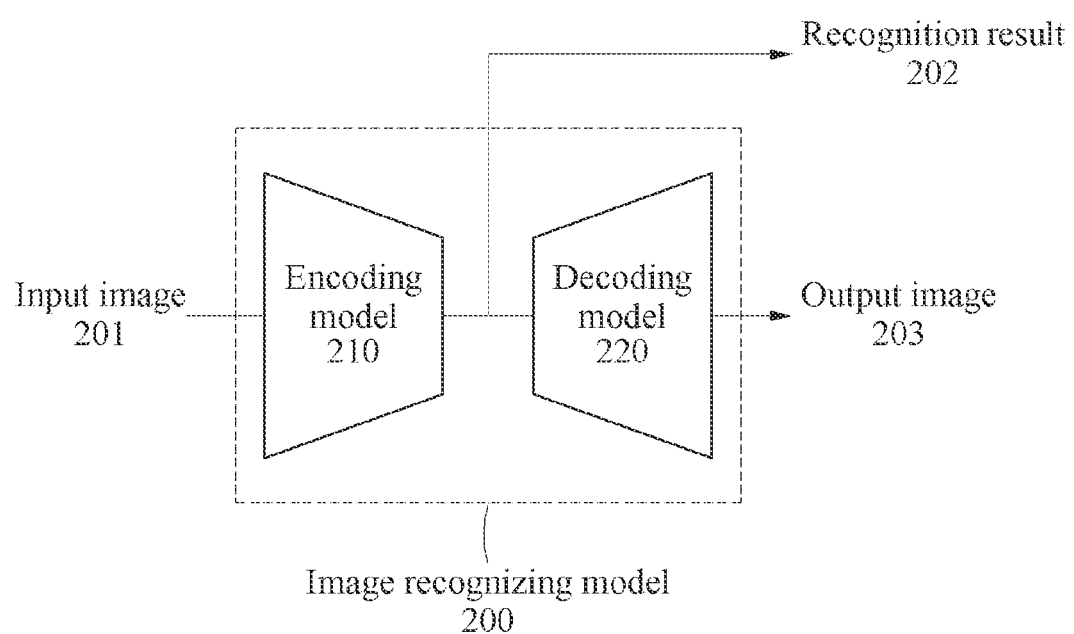
FIG. 2 illustrates an example of a configuration of an image recognizing model.

FIG. 2 illustrates an example of a configuration of an image recognizing model. Referring to FIG. 2, an image recognizing model 200 may include an encoding model 210 (e.g., an encoder) and a decoding model 220 (e.g., a decoder). The encoding model 210 and the decoding model 220 may be neural network-based models that are trained in advance. The image recognizing model 200 may be the one configured to include both an encoder and a decoder of the secondary recognition model in the training process described above with reference to FIG. 1.

The encoding model 210 may extract an input feature from an input image 201, and the image recognizing model 200 may generate a recognition result 202 for the input image 201 based on the input feature. For example, an image recognizing apparatus and/or the image recognizing model 200 may generate an input feature vector through convolution and/or global average pooling (GAP) on the input image 201, and generate the recognition result 202 through a softmax operation on the input feature vector. In this case, the recognition result 202 may include category information obtained by object classification. However, the recognition result 202 may include a variety of other information, and the image recognizing model 200 may process the input feature in various other manners to generate the recognition result 202.

The encoding model 210 may have network parameters that are robust to images of various qualities through a two-stage training method using a decoder. Accordingly, the encoding model 210 of one or more embodiments may extract the input feature of a consistent quality level regardless of the quality of the input image 201. For example, the encoding model 210 may extract consistently an input feature of a second quality from the input image 201 irrespective of whether the input image 201 is of a first quality (e.g., low quality) or the second quality (e.g., high quality). Accordingly, the image recognizing model 200 of one or more embodiments may exhibit a recognition performance of a consistent level regardless of the quality of the input image 201.

The decoding model 220 may generate an output image 203 based on the input feature. For example, the decoding model 220 may generate the output image 203 of the second quality based on the input feature of the second quality (e.g., high quality). The image recognizing apparatus and/or the image recognizing model 200 may input the input feature directly to the decoding model 220, or apply necessary processing (e.g., depth-to-space transformation) on the input feature and input the processed input feature to the decoding model 220.

The image recognizing apparatus may output both the recognition result 202 and the output image 203. For example, the image recognizing apparatus may output both the recognition result 202 and the output image 203 through a display module. In this case, the recognition result 202 may be category information of an object in the input image 201, and the output image 203 may have improved quality compared to the input image 201. As an example, the input image 201 may be a dark, very noisy, low-quality image obtained by capturing an object in low luminance, the recognition result 202 may include category information of the object, and the output image 203 may be a high-quality image with improved brightness and noise. As another example, the input image 201 may be a low-quality image obtained by capturing a person in small size, the recognition result 202 may include position information of a detection/tracking box of the person and/or identity information of the person, and the output image 203 may be a high-quality image with resolution improved by magnifying the person.

Figure 3:
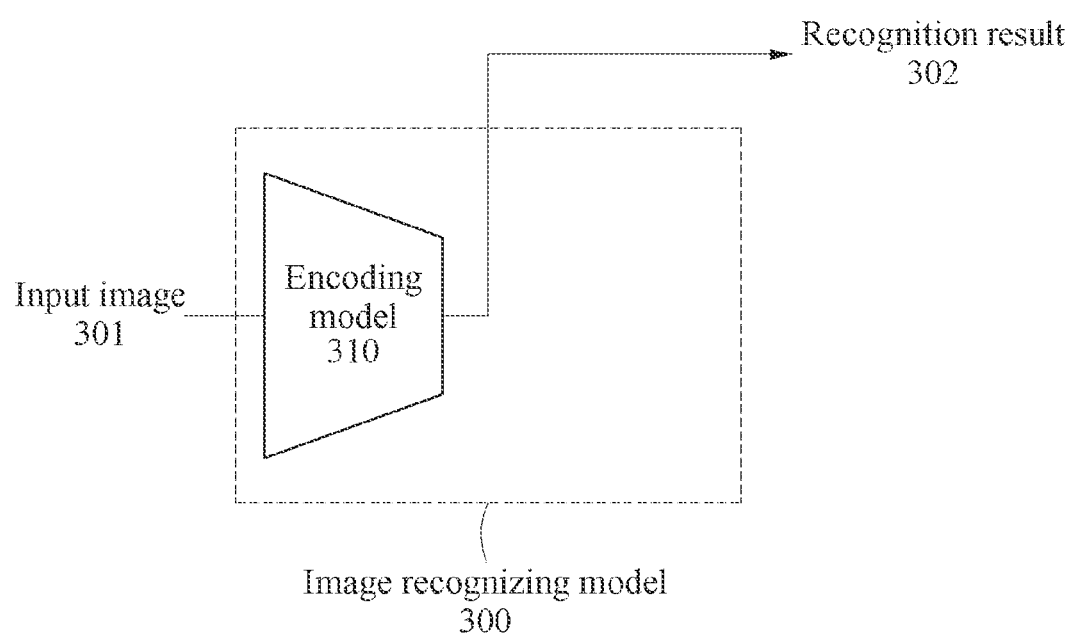
FIG. 3 illustrates an example of a configuration of an image recognizing model.

FIG. 3 illustrates an example of a configuration of an image recognizing model. Referring to FIG. 3, an image recognizing model 300 may include an encoding model 310 (e.g., an encoder). The encoding model 310 may be a neural network-based model that is trained in advance. The image recognizing model 300 may not include the decoding model 220, when compared to the image recognizing model 200 of FIG. 2. In other words, the image recognizing model 300 may be a model configured to include the encoder and exclude the decoder of the secondary recognition model in the training process described above.

The description of the image recognizing model 200 may apply to the image recognizing model 300, except that the image recognizing model 300 may neither include the decoding model 220 nor output the output image 203. For example, the encoding model 310 may extract an input feature from an input image 301, and the image recognizing model 300 may generate a recognition result 302 for the input image 301 based on the input feature. Since the encoding model 310 may correspond to the encoding model 210, the encoding model 310 may have network parameters that are robust to images of various qualities through a two-stage training method using a decoder, like the encoding model 210.

Figure 4:
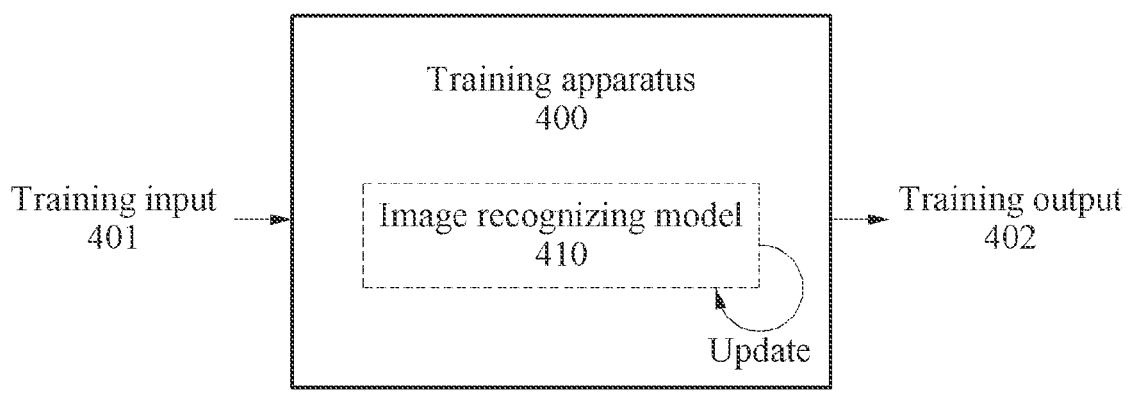
FIG. 4 illustrates an example of a training operation of a training apparatus.

FIG. 4 illustrates an example of a training operation of a training apparatus. Referring to FIG. 4, a training apparatus 400 may train an image recognizing model 410 using a training input 401 and a training output 402. For example, the training apparatus 400 may input the training input 401 to the image recognizing model 410 and update the image recognizing model 410 to reduce the difference between the corresponding training output 402 and a ground truth (GT). More specifically, the training apparatus may update network parameters of the image recognizing model 410 to reduce a loss according to a loss function.

The training apparatus 400 may train the image recognizing model 410 through a two-stage training method using a decoder. More specifically, the training apparatus 400 may train a temporary model with a primary training image set including training images of a second quality (e.g., high quality) in Stage 1, and fix a parameter of the decoding model of the image recognizing model 410 to a decoding parameter of the temporary model and then train the image recognizing model 410 with a secondary training image set including training images of a first quality (e.g., low quality) and the second quality (high quality) in Stage 2. Hereinafter, non-limiting examples of the training process for the image recognizing model 410 will be described in more detail.

Figure 5:
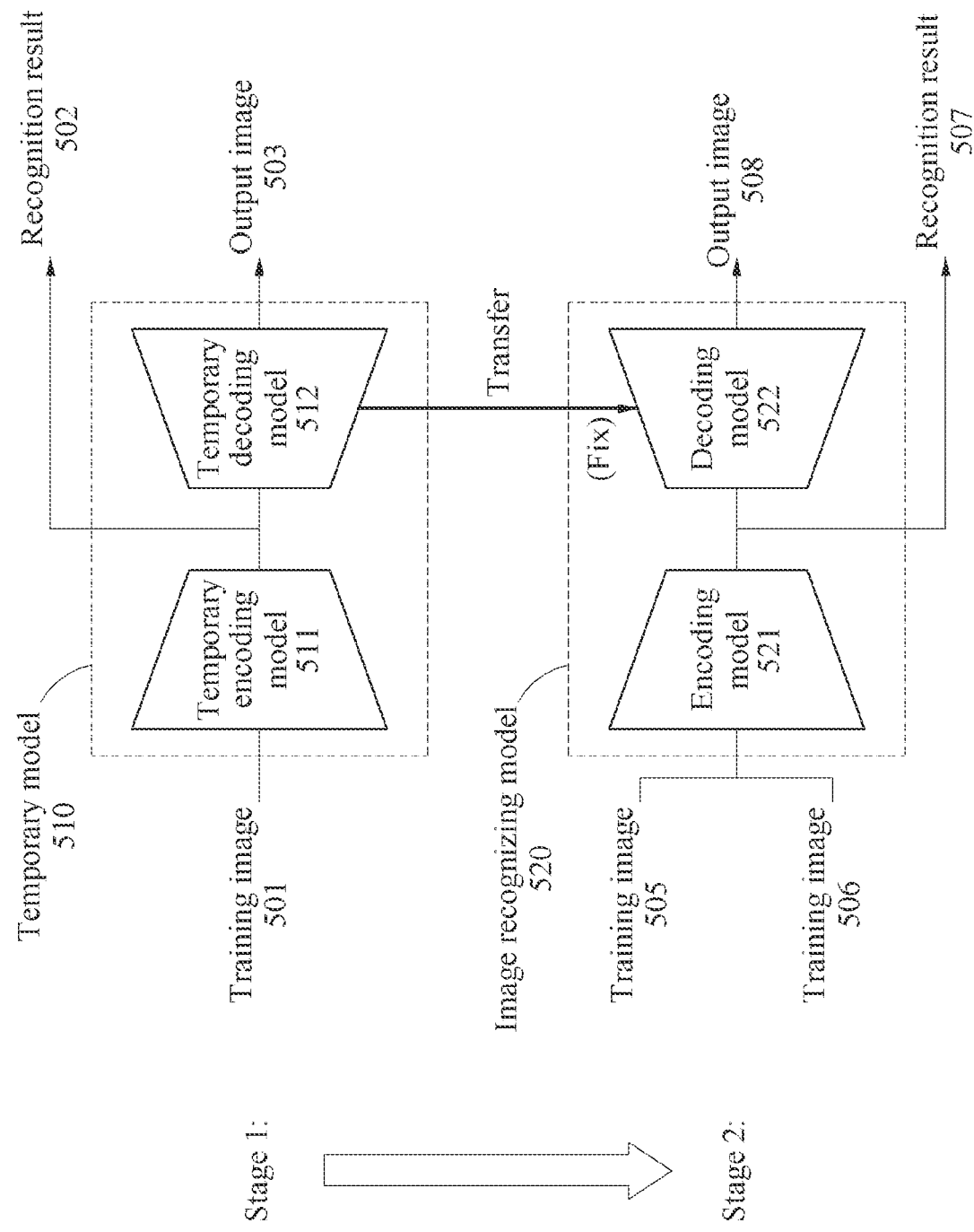
FIG. 5 illustrates an example of a training process for an image recognizing model.

FIG. 5 illustrates an example of a training process for an image recognizing model. Referring to FIG. 5, in Stage 1, a temporary model 510 may be trained based on a training image 501. The training image 501 may be extracted from a primary training image set including training images of a second quality (e.g., high quality). The temporary model 510 may include a temporary encoding model 511 (e.g., encoder) and a temporary decoding model 512 (e.g., decoder) that are based on a neural network model. The temporary encoding model 511 may extract a training feature from the training image 501 and derive a recognition result 502 based on the training feature. Further, the temporary decoding model 512 may reconstruct an output image 503 by decoding the training feature. The training apparatus may update (e.g., train) the temporary model 510 based on a loss calculated based on the recognition result 502 and the output image 503. The temporary model 510 may be iteratively updated (e.g., trained) through the other training images in the primary training image set. In Stage 1, the temporary model 510 may be iteratively updated until the loss is less than or equal to a predetermined threshold, and Stage 1 may be terminated when the loss is less than or equal the predetermined threshold. When Stage 1 is terminated after a number of iterations, the trained network parameters of the temporary model 510 may be determined.

In Stage 1, the temporary model 510 may be trained to satisfy Equation 1 below, for example.

$$f_H^{-1}(f_H(x)) = g_H(f_H(x))$$

$$x = g_H(f_H(x)) \quad \text{Equation 1:}$$

In Equation 1, x denotes the training image 501, $f_H$ denotes the temporary encoding model 511, and $g_H$ denotes the temporary decoding model 512. Accordingly, when training according to Equation 1 is completed, the output image 503 identical to the training image 501 may be derived by the temporary model 510 in response to the input of the training image 501. When the training image 501 is of the second quality (e.g., high quality), through Stage 1, the temporary encoding model 511 may be trained to extract a feature of the second quality from the training image 501 of the second quality, and the temporary decoding model 512 may be trained to reconstruct the output image 503 of the second quality based on the feature of the second quality.

In Stage 2, an image recognizing model 520 may be trained based on training images 505 and 506. The image recognizing model 520 may include an encoding model 521 and a decoding model 522 that are based on a neural network. The temporary decoding model 512 and/or the parameters thereof may be transferred to the decoding model 522, and parameters of the decoding model 522 may be fixed to the parameters of the temporary decoding model 512, such that the parameters of the decoding model 522 are the same as the trained parameters of the temporary decoding model 512 trained in Stage 1. The training images 505 and 506 may be extracted from a secondary training image set including training images of a first quality (e.g., low quality) and a second quality (e.g., high quality). For example, the training image 505 may be of the first quality, and the training image 506 may be of the second quality.

The encoding model 521 may extract training features from the training images 505 and 506 and derive a recognition result 507 based on the training features. Further, the decoding model 522 may reconstruct an output image 508 by decoding the training features. The training images 505 and 506 may be sequentially input, rather than being input at the same time, to train the image recognizing model 520. As a non-limiting example of the sequential input, the encoding model 521 may extract one or more first training features from the training image 505 and derive a first recognition result 507 based on the one or more first training features, and the encoding model 521 may extract one or more second training features from the training image 506 and derive a second recognition result 507 based on the one or more second training features. Further, as a non-limiting example of the sequential input, the decoding model 522 may reconstruct a first output image 508 by decoding the one or more first training features, and the decoding model 522 may reconstruct a second output image 508 by decoding the one or more second training features. The training apparatus may update the image recognizing model 520 based on a loss calculated based on the recognition result 507 and the output image 508. Since the parameters of the decoding model 522 are fixed, parameters of the encoding model 521 may be updated and parameters of the decoding model 522 may not be updated in Stage 2. The image recognizing model 520 may be iteratively updated through the other training images in the secondary training image set, and when Stage 2 is terminated, the network parameters of the image recognizing model 520 may be determined. In Stage 2, the image recognizing model 520 may be iteratively updated until the loss is less than or equal to a predetermined threshold, and Stage 2 may be terminated when the loss is less than or equal the predetermined threshold.

In Stage 2, the image recognizing model 520 may be trained to satisfy Equation 2 below, for example.

$$f_H(x) = f_s(x)$$

$$f_H(x) = f_s(\hat{x}) \quad \text{Equation 2:}$$

In Equation 2, $\hat{x}$ denotes the training image 505, x denotes the training image 506, $f_H$ denotes the temporary encoding model 511, and $f_s$ denotes the encoding model 521. Therefore, when training according to Equation 2 is completed, the extracted features may be the same as those obtained by inputting the training image 506 of the second quality to the temporary encoding model 511, irrespective of whether the training image 505 of the first quality is input to the encoding model 521 or the training image 506 of the second quality is input to the encoding model 521. This indicates that if the first quality is low quality and the second quality is high quality, features corresponding to a high-quality image are extracted when a low-quality image is input to the encoding model 521. Equations 3 and 4 may be derived from Equation 2, as shown below, for example.

$$g_H(f_H(x)) = g_H(f_s(x))$$

$$x = g_H(f_s(x)) \quad \text{Equation 3:}$$

$$g_H(f_H(x)) = g_H(f_s(\tilde{x}))$$

$$x = g_H(f_s(\tilde{x})) \quad \text{Equation 4:}$$

Equations 3 and 4 indicate that the training image 506 of the second quality may be derived as the output image 508, irrespective of whether the training image 505 of the first quality is input to the image recognizing model 520 or the training image 506 of the second quality is input to the image recognizing model 520. In other words, if the first quality is low quality and the second quality is high quality, a high-quality image may be derived when a low-quality image is input to the image recognizing model 520. Therefore, through the two-stage training, the encoding model 521 may extract a feature corresponding to the high-quality image from the low-quality image, and the decoding model 522 may reconstruct the high-quality image based on the feature corresponding to the high-quality image.

In order to realize the relationship of Equation 1 in Stage 1, a loss function as expressed by Equation 5 below may be used, for example.

$$L_{stage1}(\theta_H, w, \phi_H; \mathcal{D}) =$$

$$L_{softmax}(\theta_H, w; \mathcal{D}) + \lambda L_{quality}(\theta_H, \phi_H; \mathcal{D}) \quad \text{Equation 5:}$$

In Equation 5, $L_{stage1}$ denotes the loss function for Stage 1, $\theta_H$ denotes the parameters of the temporary encoding model 511, $\phi_H$ denotes the parameters of the temporary decoding model 512, and $\mathcal{D}$ denotes a data set including training images of the second quality (e.g., high quality). Softmax may be used in the process of deriving the recognition result 502 based on the features extracted by the temporary encoding model 511. In this case, w denotes a softmax weight. $L_{softmax}$ denotes a recognition loss, $L_{quality}$ denotes a reconstruction loss, and $\lambda$ denotes an adjustment weight. The recognition loss and the reconstruction loss may be expressed by Equations 6 and 7 below, for example.

$$L_{softmax}(\theta_H, w; \mathcal{D}) = \frac{1}{|\mathcal{D}|} \sum_{(x,y) \in \mathcal{D}} \log \frac{e^{w_y^T \mathcal{H}(f_{\theta_H}(x))}}{\sum_{k \in C} e^{w_k^T \mathcal{H}(f_{\theta_H}(x))}} \quad \text{Equation 6}$$

Equation 6 represents the recognition loss calculated based on softmax and cross-entropy. In Equation 6, $f_{\theta_H}$ denotes the temporary encoding model 511, and $\mathcal{H}$ denotes global average pooling (GAP). GAP is an example, and other operations for converting the output features of the temporary encoding model 511 to an input for softmax may be alternatively used.

$$L_{quality}(\theta_H, \phi_H; \mathcal{D}) = \frac{1}{|\mathcal{D}|} \sum_{(x,y) \in \mathcal{D}} d(x, g_{\phi_H}(f_{\theta_H}(x))) \quad \text{Equation 7}$$

In Equation 7, d(a, b) denotes a distance or divergence between a and b, and for example, L1 norm or L2 norm may be used to calculate the distance. $g_{\phi_H}$ denotes the temporary decoding model 512.

In order to realize the relationship of Equation 2 in Stage 2, a loss function as expressed by Equation 8 below may be used, for example. Stage 2 differs from Stage 1 in that the parameters of the decoding model 522 may be transferred from the temporary decoding model 512 and fixed thereto, and that a different training image set is used. Equation 8 reflects this.

$$L_{stage2}(\theta_s, w; \mathcal{D}, \tilde{\mathcal{D}}) =$$

$$L_{softmax}(\theta_s, w; \tilde{\mathcal{D}}) + \lambda L_{quality}(\theta_s, \mathcal{D}; \tilde{\mathcal{D}}) \quad \text{Equation 8:}$$

In Equation 8, $L_{stage2}$ denotes the loss function for Stage 2, $\theta_s$ denotes the parameters of the encoding model 521, w denotes the softmax weight, $\mathcal{D}$ denotes the data set including the training images of the second quality (e.g., high quality), and $\tilde{\mathcal{D}}$ denotes a data set including training images of the first quality (e.g., low quality). $L_{softmax}$ denotes a recognition loss, $L_{quality}$ denotes a reconstruction loss, and $\lambda$ denotes an adjustment weight. The recognition loss and the reconstruction loss may be expressed by Equations 9 and 10 below, for example.

$$L_{softmax}(\theta_s, w; \tilde{\mathcal{D}}) = \frac{1}{|\tilde{\mathcal{D}}|} \sum_{(\tilde{x},y) \in \tilde{\mathcal{D}}} \log \frac{e^{w_y^T \mathcal{H}(f_{\theta_s}(\tilde{x}))}}{\sum_{k \in C} e^{w_k^T \mathcal{H}(f_{\theta_s}(\tilde{x}))}} \quad \text{Equation 9}$$

In Equation 9, $f_{\theta_s}$ denotes the encoding model 521, and $\mathcal{H}$ denotes GAP. Equation 9 indicates that only the data set $\tilde{\mathcal{D}}$ of the first quality (e.g., low quality) is used for training. However, alternatively, both the data set $\mathcal{D}$ of the second quality (e.g., high quality) and the data set $\tilde{\mathcal{D}}$ of the first quality (e.g., low quality) may be used.

$$L_{quality}(\theta_s, \mathcal{D}; \tilde{\mathcal{D}}) = \frac{1}{|\tilde{\mathcal{D}}|} \sum_{(x,\tilde{x},y) \in \tilde{\mathcal{D}}, \mathcal{D}} d(x, g_{\phi_H}(f_{\theta_s}(\tilde{x}))) \quad \text{Equation 10}$$

In Equation 10, $g_{\phi_H}$ denotes the temporary decoding model 512. Accordingly, the decoding model 522 may correspond to a state in which the parameters of the temporary decoding model 512 are transferred and fixed (e.g., the parameters of the decoding model 522 may be fixed to be the trained parameters of the temporary decoding model 512 trained in Stage 1).

Figure 6:
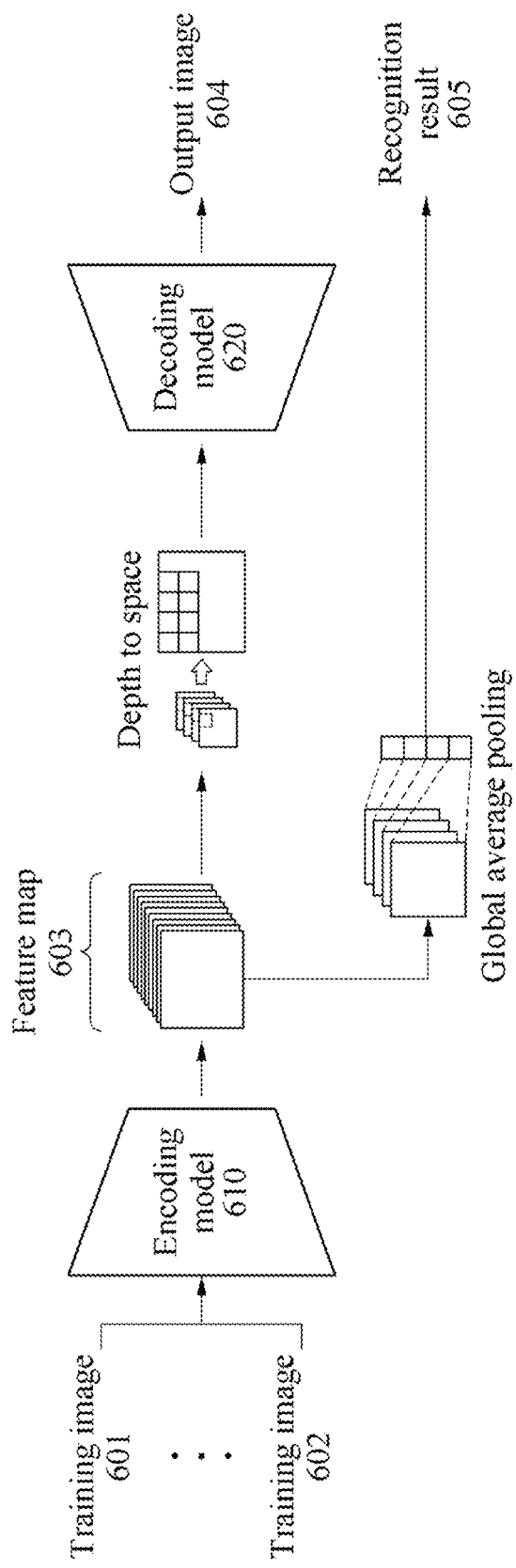
FIG. 6 illustrates an example of a second stage in a training process.

FIG. 6 illustrates an example of a second stage in a training process (e.g., Stage 2 in the training process of FIG. 5). Referring to FIG. 6, an encoding model 610 may be trained through training images 601 and 602. For example, the training image 601 may be of a first quality (e.g., low quality), and the training image 602 may be of a second quality (e.g., high quality). The training images 601 and 602 may be sequentially input, rather than being input at the same time, to train the encoding model 610.

The encoding model 610 may generate a feature map 603 by extracting features from the training images 601 and 602. The feature map 603 may be converted into a feature vector through an operation such as GAP, and a recognition result 605 may be generated through a softmax operation on the feature vector. The decoding model 620 may reconstruct an output image 604 based on the feature map 603. In this case, processing such as depth-to-space transformation may be applied to the feature map 603 for input to the decoding model 220. For example, the size of the feature map 603 may be 7×7×512, and the feature map 603 may be converted into data of 112×112×2 through depth-to-space transformation and input to the decoding model 220. The size of the feature vector may be 1×1×512. These values are only an example, and various other processing may apply to the feature map 603.

Figure 7:
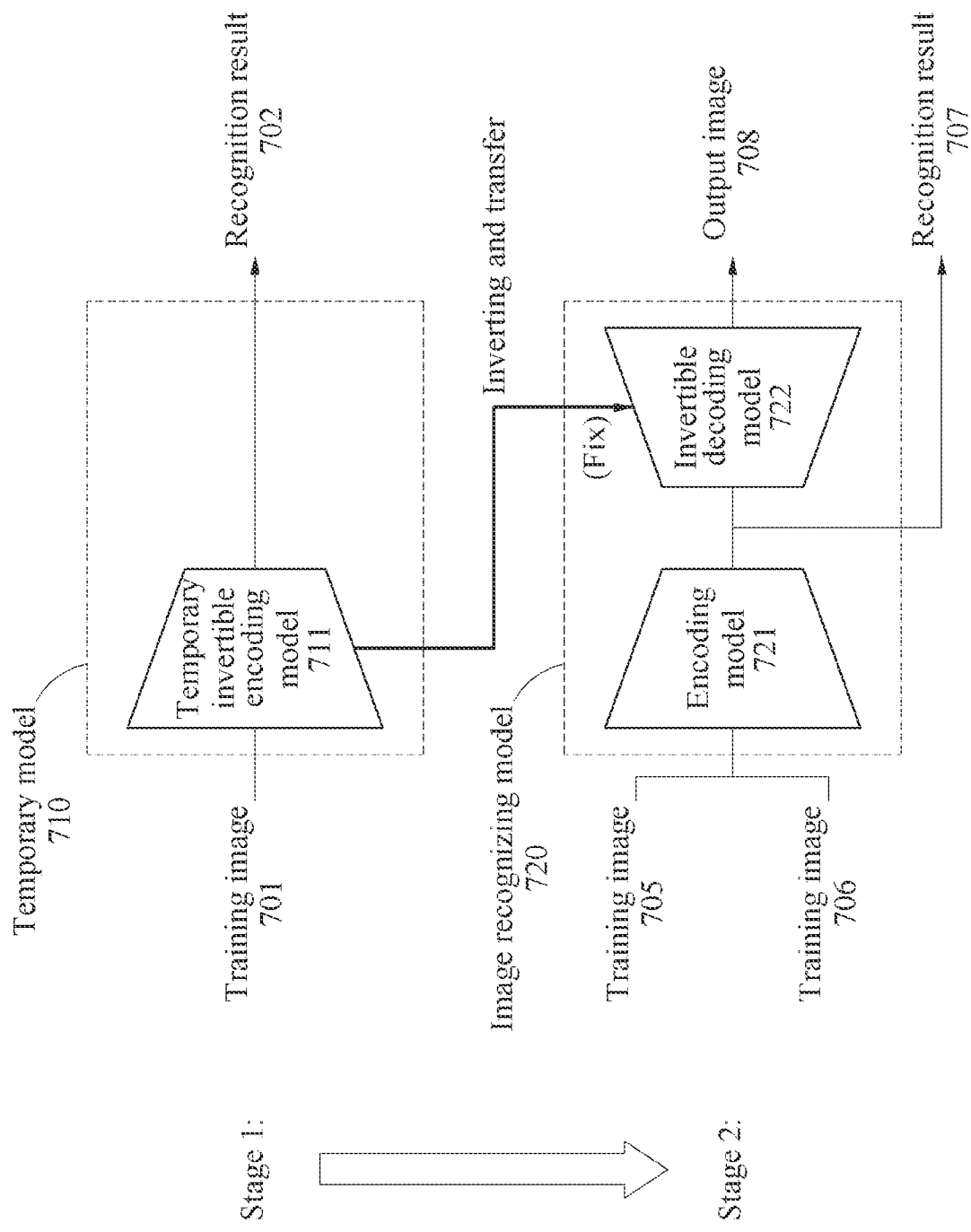
FIG. 7 illustrates an example of a training process for an image recognizing model.

FIG. 7 illustrates an example of a training process for an image recognizing model. Referring to FIG. 7, a temporary model 710 may include a temporary invertible encoding model 711, unlike the temporary model 510 of FIG. 5. The temporary invertible encoding model 711 may be a neural network-based model and may be simply referred to as the invertible encoding model 711, and may be converted into an invertible decoding model 722 through inverting. The relationship between the invertible encoding model 711 and the invertible decoding model 722 may be expressed by Equation 11 below, for example.

$$g_H = f_H^{-1}$$  Equation 11:

In Equation 11, $f_H$ denotes the invertible encoding model 711, and $g_H$ denotes the invertible decoding model 722. The invertible encoding model 711 may be an encoder for extracting features from an image, and the invertible decoding model 722 may be a decoder for reconstructing an image from features. If features are extracted from an original image through the invertible encoding model 711 and an image is reconstructed from the features through the invertible decoding model 722, the original image and the reconstructed image may match. This may be compensation for a difference between an original image and a reconstructed image that may occur when features are extracted from the original image and the image is reconstructed from the features through the temporary encoding model 511 and the temporary decoding model 512 of the temporary model 510. Further, unlike the temporary model 510 that is trained through both the recognition loss and the reconstruction loss, the temporary model 710 may be trained with the recognition loss but not with the reconstruction loss.

More specifically, in Stage 1, the temporary model 710 may be trained based on a training image 701. The training image 701 may be extracted from a primary training image set including training images of a second quality (e.g., high quality). The temporary invertible encoding model 711 may extract a training feature from the training image 701 and derive a recognition result 702 based on the training feature. A training apparatus may update the temporary model 710 based on a loss according to the recognition result 702. The temporary model 710 may be iteratively updated through the other training images in a primary training image set. When Stage 1 is terminated, network parameters of the temporary model 710 may be determined.

When the training image 701 is of the second quality (e.g., high quality), through Stage 1, the temporary invertible encoding model 711 may be trained to extract a feature of the second quality from the training image 701 of the second quality. When the temporary invertible encoding model 711 is inverted to the invertible decoding model 722, the invertible decoding model 722 may reconstruct a second image 708 of the second quality based on the feature of the second quality.

In Stage 1, a loss function as expressed by Equation 12 below may be used, for example.

$$L_{stage1}(\theta_H, w; \mathcal{D}) = L_{softmax}(\theta_H, w; \mathcal{D})$$  Equation 12:

In Equation 12, $L_{stage1}$ denotes the loss function for Stage 1, $\theta_H$ denotes the parameters of the temporary invertible encoding model 711, w denotes a softmax weight, and $\mathcal{D}$ denotes a data set including training images of the second quality (e.g., high quality). $L_{softmax}$ denotes a recognition loss. Since the temporary model 710 does not include a decoding model, a reconstruction loss may not be used. Equation 6 may be used to calculate the recognition loss of Equation 12.

In Stage 2, an image recognizing model 720 may be trained based on training images 705 and 706. The temporary invertible encoding model 711 and/or parameters thereof may be inverted and transferred to the invertible decoding model 722, and the parameters of the invertible decoding model 722 may be fixed. The training images 705 and 706 may be extracted from a secondary training image set including training images of a first quality (e.g., low quality) and a second quality (e.g., high quality). For example, the training image 705 may be of the first quality, and the training image 706 may be of the second quality.

An encoding model 721 may extract training features from the training images 705 and 706 and derives a recognition result 707 based on the training features. Further, the invertible decoding model 722 may reconstruct an output image 708 by decoding the training features. The invertible decoding model 722 may be a decoder for reconstructing the output image 708 of the second quality based on the features of the second quality. The training apparatus may update the image recognizing model 720 based on a loss calculated based on the recognition result 707 and the output image 708. Since the parameters of the decoding model 722 are fixed, parameters of the encoding model 721 may be updated and the parameters of the decoding model 722 may not be updated in Stage 2. The image recognizing model 720 may be iteratively updated through the other training images in a secondary training image set, and when Stage 2 is terminated, the network parameters of the image recognizing model 720 may be determined. In Stage 2, the loss function according to Equations 8 to 10 may be used.

Figure 8:
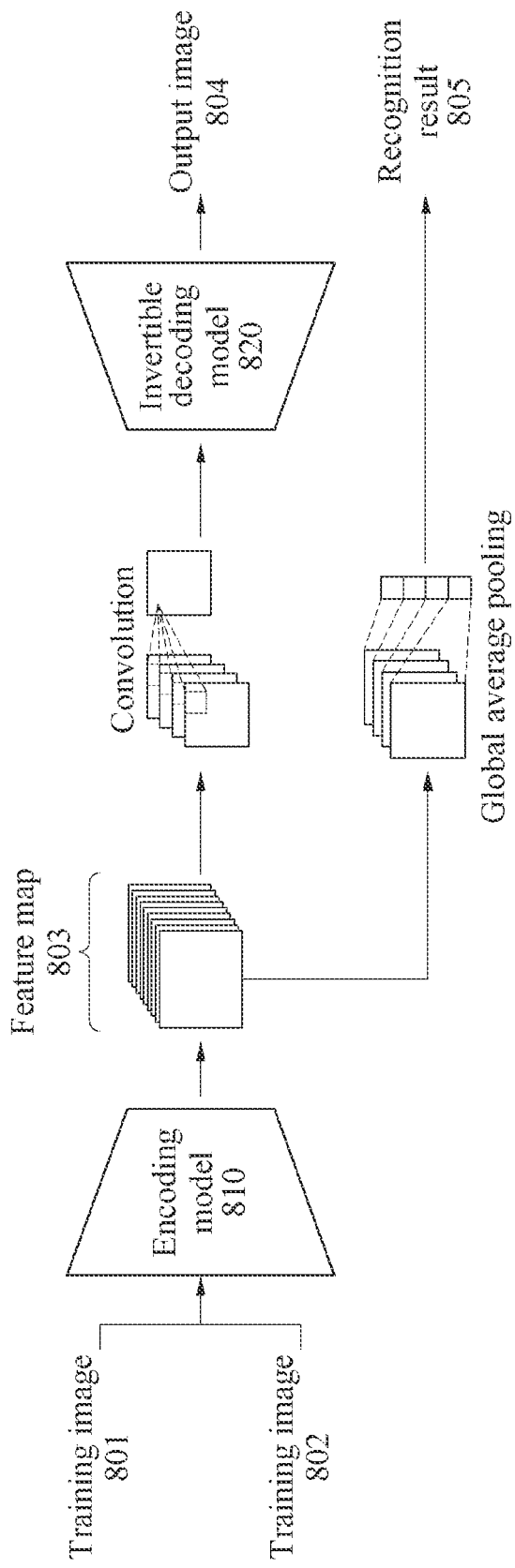
FIG. 8 illustrates an example of a second stage in a training process.

FIG. 8 illustrates an example of a second stage in a training process (e.g., Stage 2 in the training process of FIG. 7). Referring to FIG. 8, an encoding model 810 may be trained through training images 801 and 802. For example, the training image 801 may be of a first quality (e.g., low quality), and the training image 802 may be of a second quality (e.g., high quality). The training images 801 and 802 may be sequentially input, rather than being input at the same time, to train the encoding model 810.

The encoding model 810 may generate a feature map 803 by extracting features from the training images 801 and 802. The feature map 803 may be converted into a feature vector through an operation such as GAP, and a recognition result 805 may be generated through a softmax operation on the feature vector. An invertible decoding model 820 may reconstruct an output image 804 based on the feature map 803. In this case, processing such as convolution may be applied to the feature map 803 for input to the invertible decoding model 820. For example, the size of the feature map 803 may be 7×7×2048, and the feature map 803 may be converted into data of 7×7×3072 through convolution and input to the invertible decoding model 820. The size of the feature vector may be 1×1×2048. These values are only an example, and various other processing may apply to the feature map 803.

Figure 9:
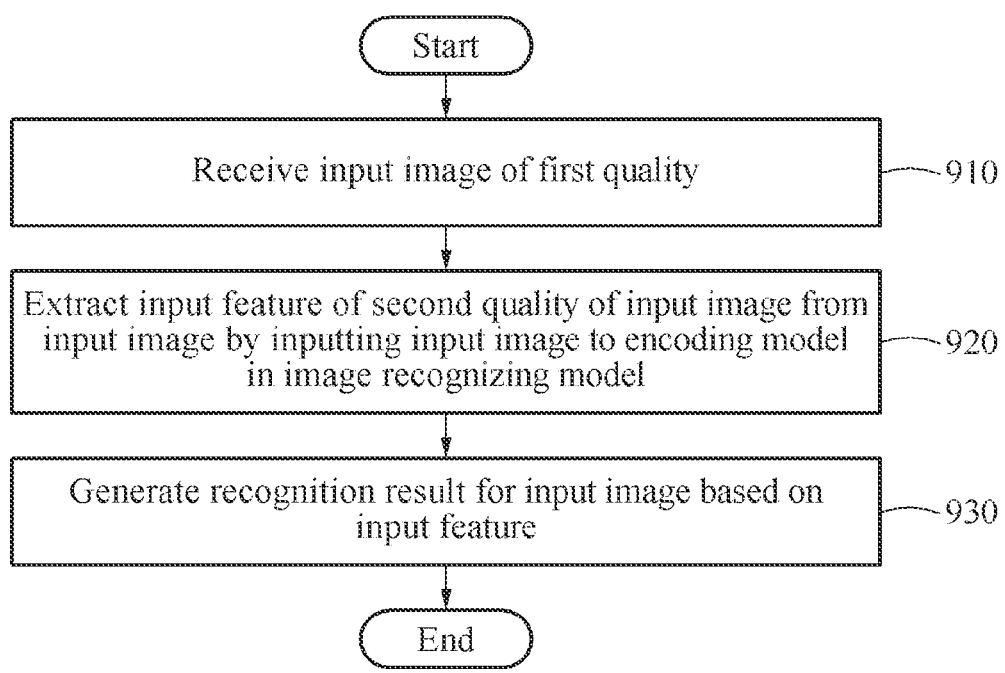
FIG. 9 illustrates an example of an image recognizing method.

FIG. 9 illustrates an example of an image recognizing method. Referring to FIG. 9, in operation 910, an image recognizing apparatus may receive an input image of a first quality. In operation 920, the image recognizing apparatus may extract an input feature of a second quality of the input image from the input image by inputting the input image to an encoding model in an image recognizing model. In operation 930, the image recognizing apparatus may generate a recognition result for the input image based on the input feature. The encoding model may extract, in response to an input of a second input image of the second quality, a second input feature of the second quality from the second input image. The encoding model may be a neural network-based model that is trained in advance to output the input feature of the second quality from the input image irrespective of whether the input image is of the first quality or of the second quality. The image recognizing model may further include a decoding model, and the image recognizing apparatus may generate an output image of the second quality by inputting the input feature to the decoding model. The decoding model may be a neural network-based model that is trained in advance to generate the output image of the second quality based on the input feature of the second quality. The image recognizing apparatus may output both the recognition result and the output image. In addition, the description provided with reference to FIGS. 1 to 8 and 10 to 12 may apply to the image recognizing method.

Figure 10:
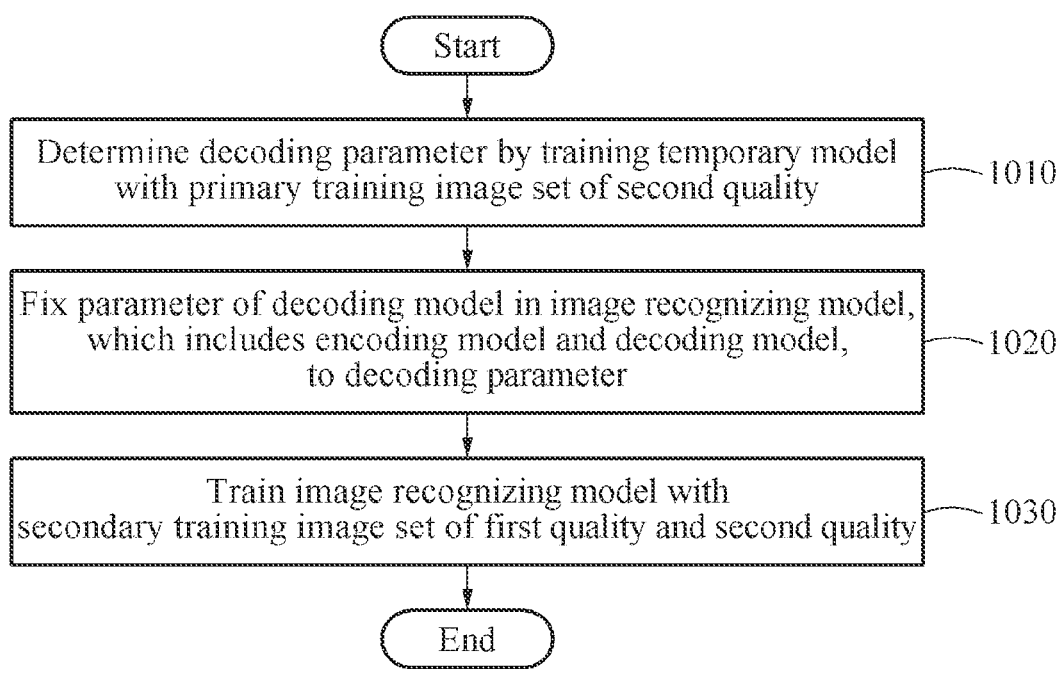
FIG. 10 illustrates an example of a training method.

FIG. 10 illustrates an example of a training method. Referring to FIG. 10, in operation 1010, a training apparatus may determine a decoding parameter by training a temporary model with a primary training image set of a second quality. The temporary model may include a temporary encoding model and a temporary decoding model. In this case, the training apparatus may determine a recognition loss according to a first training feature extracted by the temporary encoding model from a first training image in the primary training image set, determine a reconstruction loss according to a first output image reconstructed by the temporary decoding model based on the first training feature, and update the temporary model based on the recognition loss and the reconstruction loss. In another example, the temporary model may include a temporary invertible encoding model. In this case, the training apparatus may determine a recognition loss according to a first training feature extracted by the temporary invertible encoding model from a first training image in the primary training image set, and determine the decoding parameter by updating the temporary model based on the recognition loss.

In operation 1020, the training apparatus may fix a parameter of a decoding model in an image recognizing model, which includes an encoding model and the decoding model, to the decoding parameter. In operation 1030, the training apparatus may train the image recognizing model with a secondary training image set of a first quality and the second quality. The training apparatus may determine a recognition loss according to a second training feature extracted by the encoding model from a second training image in the secondary training image set, determine a reconstruction loss according to a second output image reconstructed by the decoding model based on the second training feature, and update the image recognizing model based on the recognition loss and the reconstruction loss. In addition, the description provided with reference to FIGS. 1 to 9, 11, and 12 may apply to the training method.

Figure 11:
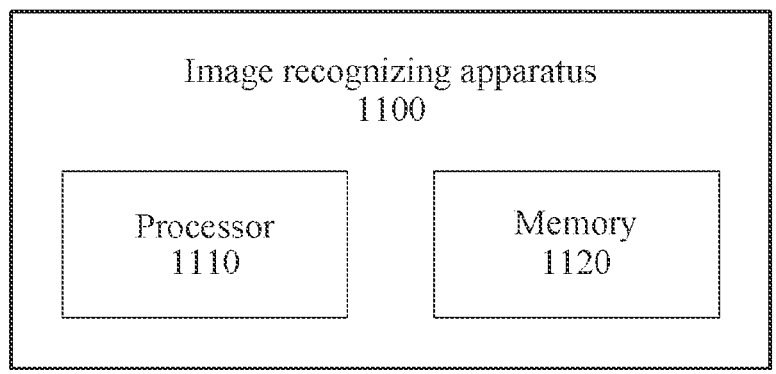
FIG. 11 illustrates an example of a configuration of an image recognizing apparatus.

FIG. 11 illustrates an example of a configuration of an image recognizing apparatus. Referring to FIG. 11, an image recognizing apparatus 1100 may include a processor 1110 (e.g., one or more processors) and a memory 1120 (e.g., one or more memories). The memory 1120 may be connected to the processor 1110, and may store instructions executable by the processor 1110, data to be calculated by the processor 1110, and/or data processed by the processor 1110. The memory 1120 may include a non-transitory computer-readable medium, for example, a high-speed random-access memory, and/or a non-volatile computer-readable storage medium, for example, one or more disk storage devices, flash memory device, or other non-volatile solid state memory devices.

The processor 1110 may execute instructions to perform the operations described with reference to FIGS. 1 to 10, and 12. For example, the processor 1110 may receive an input image of a first quality, extract an input feature of a second quality of the input image from the input image by inputting the input image to an encoding model in an image recognizing model, and generate a recognition result for the input image based on the input feature. In addition, the description provided with reference to FIGS. 1 to 10, and 12 may apply to the image recognizing apparatus 1100.

Figure 12:
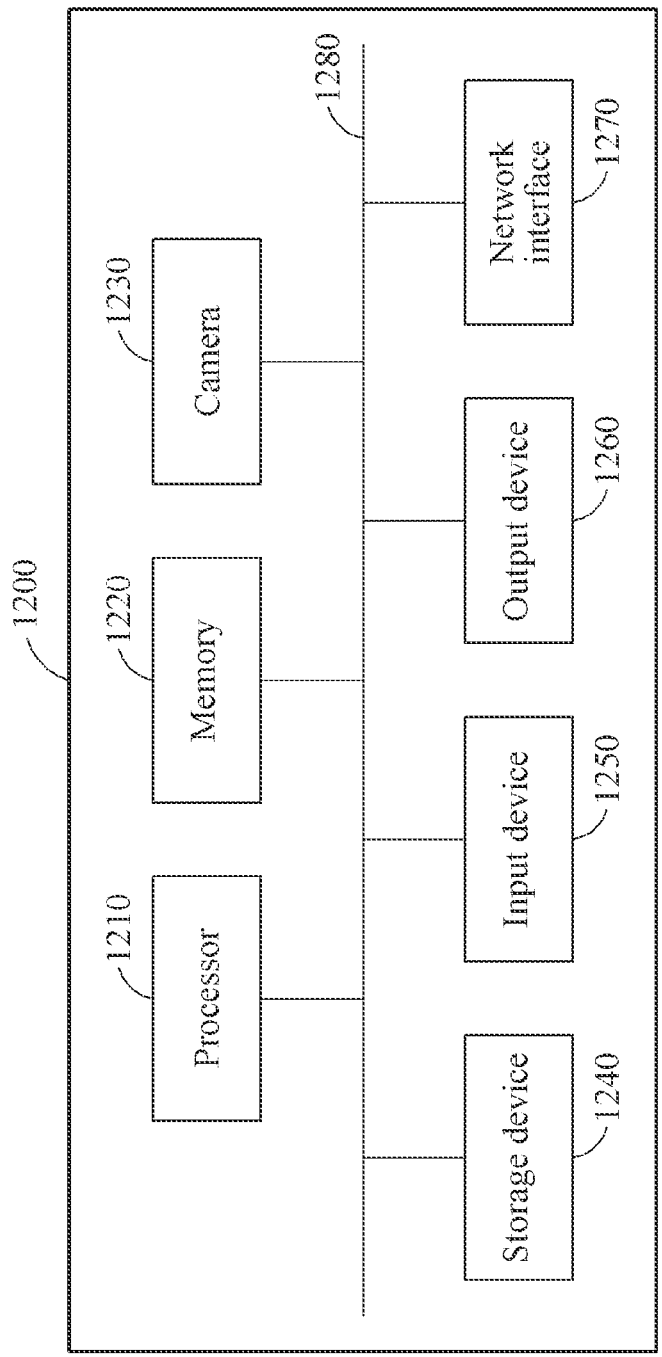
FIG. 12 illustrates an example of a configuration of an electronic device.

FIG. 12 illustrates an example of a configuration of an electronic device. Referring to FIG. 12, an electronic device 1200 may include a processor 1210 (e.g., one or more processors), a memory 1220 (e.g., one or more memories), a camera 1230, a storage device 1240, an input device 1250, an output device 1260, and a network interface 1270 that may communicate with each other through a communication bus 1280. For example, the electronic device 1200 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock or a closed-circuit television (CCTV), or a vehicle such as an autonomous vehicle or a smart vehicle.

The electronic device 1200 may acquire an input image and perform recognition processing on the acquired input image. Further, the electronic device 1200 may perform operations associated with a recognition result. The electronic device 1200 may structurally and/or functionally include the image recognizing apparatus 100 of FIG. 1 and/or the image recognizing apparatus 1100 of FIG. 11.

The processor 1210 may execute instructions or functions to be executed in the electronic device 1200. For example, the processor 1210 may process the instructions stored in the memory 1220 or the storage device 1240. The processor 1210 may perform the one or more operations described through FIGS. 1 to 11.

The memory 1220 may store data for image recognition. The memory 1220 may include a computer-readable storage medium or a computer-readable storage device. The memory 1220 may store instructions to be executed by the processor 1210 and may store related information while software and/or an application is executed by the electronic device 1200.

The camera 1230 may capture a photo and/or a video. For example, the camera 1230 may capture a face image including a face of a user. The camera 1230 may be a three-dimensional (3D) camera including depth information of objects, or a CCTV camera for security.

The storage device 1240 may include a computer-readable storage medium or computer-readable storage device. The storage device 1240 may store a more quantity of information than the memory 1220 for a long time. For example, the storage device 1240 may include a magnetic hard disk, an optical disk, a flash memory, a floppy disk, or other non-volatile memories known in the art.

The input device 1250 may receive an input from the user in traditional input manners through a keyboard and a mouse, and in new input manners such as a touch input, a voice input, and an image input. For example, the input device 1250 may include a keyboard, a mouse, a touch screen, a microphone, or any other device that detects the input from the user and transmits the detected input to the electronic device 1200.

The output device 1260 may provide an output of the electronic device 1200 to the user through a visual, auditory, or tactile channel. The output device 1260 may include, for example, a display module, a touch screen, a speaker, a vibration generator, or any other device that provides the output to the user. The display module may simultaneously output both a recognition result and an output image obtained by image recognition. For example, the recognition result may be category information (e.g., person, animal, dog, cat, etc.) of an object in the input image, and the output image may have an improved quality (e.g., improvement in resolution, brightness, etc.) compared to the input image.

The network interface 1270 may communicate with an external device through a wired or wireless network.

The image recognizing apparatuses, processors, memories, electronic devices, cameras, storage devices, input devices, output devices, network interfaces, communication buses, image recognizing apparatus 100, image recognizing apparatus 1100, processor 1110, memory 1120, electronic device 1200, processor 1210, memory 1220, camera 1230, storage device 1240, input device 1250, output device 1260, network interface 1270, communication bus 1280, and other devices, apparatuses, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An image recognition method, comprising:
   receiving an input image of a first quality;
   extracting an input feature of a second quality, different than the first quality, from the input image by inputting the input image directly to a trained encoding model in an image recognizing model; and
   generating a recognition result for the input image based on the input feature,
   wherein the trained encoding model is a neural network-based model that is trained in advance by training a temporary encoding model using a secondary training image set of the first quality and the second quality and using a trained temporary decoding model of which parameters are fixed and trained in advance based on a primary training image set of the second quality, such that the trained encoding model is configured to extract respective input features of the second quality from respective input images irrespective of whether the respective input images are of the first quality or of the second quality.

2. The method of claim 1, wherein the encoding model is configured to extract, in response to an input of a second input image of the second quality, a second input feature of the second quality from the second input image.

3. The method of claim 1, further comprising:
   generating an output image of the second quality by inputting the input feature to a decoding model in the image recognizing model.

4. The method of claim 3, wherein the decoding model is a neural network-based model that is trained in advance to generate respective output images of the second quality based on respective input features of the second quality.

5. The method of claim 3, further comprising:
   outputting both the recognition result and the output image.

6. The method of claim 3, further comprising:
   by training at least a temporary decoding model using the primary training image set of the second quality, generating a temporary image recognizing model, having the temporary encoding model and the trained temporary decoding model having trained decoding parameters; and
   generating the image recognizing model, including the encoding model and the decoding model, by training the temporary image recognizing model, including a second temporary encoding model and the trained temporary decoding model, using the secondary training image set of the first quality and the second quality while the trained decoding parameters of the trained temporary decoding model are fixed,
   wherein the second quality is an image quality greater than the first quality.

7. The method of claim 1, further comprising:
   determining trained decoding parameters of the trained temporary decoding model by training a temporary decoding model using the primary training image set of the second quality; and
   generating the image recognizing model by training a temporary image recognizing model, including the temporary encoding model and the trained temporary decoding model, with using the secondary training image set of the first quality and the second quality while the trained decoding parameters of the trained temporary decoding model are fixed.

8. A non-transitory computer-readable storage medium storing instructions that, when executed by a processor, configure the processor to perform the method of claim 1.

9. An electronic device, comprising:
   a processor configured to
      extract an input feature of a second quality from an input image of a first quality, different than the second quality, by inputting the input image directly to a trained encoding model in an image recognizing model, and
      generate a recognition result for the input image based on the input feature,
   wherein the trained encoding model is a neural network-based model that is trained in advance by training a temporary encoding model using a secondary training image set of the first quality and the second quality and using a trained temporary decoding model of which parameters are fixed and trained in advance based on a primary training image set of the second quality, such that the trained encoding model is configured to extract respective input features of the second quality from respective input images irrespective of whether the respective input images are of the first quality or of the second quality.

10. The device of claim 9, wherein the encoding model is configured to extract, in response to an input of a second input image of the second quality, a second input feature of the second quality from the second input image.

11. The device of claim 9, wherein the processor is further configured to generate an output image of the second quality by inputting the input feature to a decoding model in the image recognizing model.

12. The device of claim 11, wherein the decoding model is a neural network-based model that is trained in advance to generate the output image of the second quality based on the input feature of the second quality.

13. The device of claim 11, wherein the display module is further configured to output both the recognition result and the output image.

14. The device of claim 11, wherein
the recognition result is category information of an object in the input image, and
the output image has an improved quality compared to the input image.

15. The device of claim 9, further comprising:
a camera configured to generate the input image; and
a display module configured to output the recognition result.

* * * * *